United States Patent [19]

Schudel

[11] Patent Number: 5,588,200
[45] Date of Patent: Dec. 31, 1996

[54] TIGHTENED DISTRIBUTION OF MAGNETIC-HEAD SUSPENSION-ASSEMBLY STATIC ROLL BY INFRARED STRESS RELIEF

[75] Inventor: Dale F. Schudel, T. Lamsai A.Wangnoi, Thailand

[73] Assignee: K. R. Precision Public Company Limited, Axutthaya, Thailand

[21] Appl. No.: 441,351

[22] Filed: May 15, 1995

[51] Int. Cl.⁶ .................................................. G11B 5/10
[52] U.S. Cl. ...................... 29/603.01; 72/17.3; 360/109
[58] Field of Search ........................... 29/603.01, 603.03, 29/603.7, 603.9, 603.1, DIG. 24; 250/341.1, 341.5, 341.6; 72/17.3, 342.94, 364; 148/559, 565, 714, 903; 360/104, 109

[56] References Cited

U.S. PATENT DOCUMENTS

| | | | |
|---|---|---|---|
| 4,386,458 | 6/1983 | Evans | 29/527.7 |
| 4,605,979 | 8/1986 | Inoue et al. | 360/105 |
| 4,814,908 | 3/1989 | Schmitz | 360/77.02 |
| 5,110,758 | 5/1992 | Baskett | 437/171 |
| 5,111,348 | 5/1992 | Baba | 360/109 X |
| 5,256,850 | 10/1993 | Maegawa et al. | 360/109 X |
| 5,299,081 | 3/1994 | Hatch et al. | 360/104 |
| 5,315,454 | 5/1994 | Fukakuss | 360/109 X |
| 5,341,256 | 8/1994 | Murata et al. | 360/109 X |

FOREIGN PATENT DOCUMENTS

| | | | |
|---|---|---|---|
| 488658 | 6/1992 | European Pat. Off. | 360/109 |
| 61-979 | 1/1986 | Japan | 360/109 |
| 4-212763 | 8/1992 | Japan | 360/104 |

Primary Examiner—S. Thomas Hughes
Attorney, Agent, or Firm—Antonio R. Durando

[57] ABSTRACT

A process for modifying the static attitude characteristics of magnetic head suspension assemblies by applying an infrared heat source to relieve stresses in specific regions of interest. Each assembly is tested to measure its static-roll attitude with respect to a datum reference plane; the measurement preferably consists of a deflection angle. If the deflection angle is outside the limits of a predetermined allowable tolerance, thereby indicating a region that requires subjection to a torsional stress to bring the suspension within tolerance, an infrared beam is applied specifically to the region while the load beam is held at the torsional deflected state. The infrared source stress relieves the load beam so deflected, allowing it to establish a new free state with minimal residual stress remaining in the material of the beam. The assembly is then retested and retreated, if necessary, under varying angles of torsional stress until its static roll characteristics fall within acceptable tolerances. An adaptive control algorithm may be utilized to optimize the process, so that successive suspension assemblies in a manufacturing batch are automatically processed with progressive efficiency to achieve target set points.

14 Claims, 4 Drawing Sheets

TIGHTENED DISTRIBUTION OF MAGNETIC-HEAD SUSPENSION-ASSEMBLY STATIC ROLL BY INFRARED STRESS RELIEF

BACKGROUND OF THE INVENTION

1. Field of the Invention

This invention is related in general to magnetic-head/ suspension-assembly apparatus operating in a floating manner relative to a magnetic disc. In particular, the invention consists of a novel approach for controlling production tolerances in the torsional characteristics of the suspension assemblies for magnetic heads.

2. Description of the Related Art

The magnetic-head suspension assembly of a magnetic disk system, commonly referred to as a head gimbal assembly (HGA), operates by floating in very close proximity over the surface of the magnetic disc, thereby accurately reading and writing data thereon. While the magnetic head is floating disposed substantially in parallel over the disc during operation, it must be able to adjust its attitude to conform to magnetic-disc surface imperfections and dynamic displacements, such as the surface vibrations generated by the rotating movement. Therefore, the torsional characteristics of the suspension assembly supporting the head are critical to the proper functioning of the apparatus and must be maintained within prescribed design specifications to prevent contact with the disc surface and avoid disabling consequences resulting therefrom.

FIG. 1 shows in perspective view a conventional head gimbal assembly 2 positioned over a magnetic disc 4 for illustration. The HGA 2 consists of a slider 6 mounted on a gimbal 8 which is either integral with or rigidly connected to a load beam 10 that comprises a pre-load region 12 and formed rails 22 that provide rigidity to the assembly. The combined gimbal and load beam, which constitute the suspension 11, support the slider portion of the head gimbal assembly. The suspension is in turn attached to a driving mechanism (not shown) by means of a screw or sewage mount 14. In operation, the suspension 11 is moved by the driving mechanism along the radius of the magnetic disc 4 (arrows A1) so that the slider 6 may be placed rapidly over the appropriate read/write tracks in circumferential direction with respect thereto as the disc is rotated in the direction of arrow A2.

For ease of description, the radial, tangential and vertical directions with respect to the surface of disc 4 are referenced in the figures by x, y and z coordinates, respectively. Thus, the magnetic head slider 6 is supported by the gimbal 8 for controlling pitching and rolling movements as the slider's position changes in the radial (x axis) and circumferential (y axis) directions of the magnetic disc 4. FIG. 2 illustrates in exploded perspective view the essential portions of conventional prior-art magnetic-head supporting apparatus. As also shown in the partial cross-section of FIG. 3, the slider 6 is attached to a gimbal tongue 42 of the gimbal 8, while the load beam 10 is attached to the outer frame of the gimbal 8 by means of a tap at 44. The tongue 42 has a preformed angle and twist and comprises a convex dimple 46 adapted to pivot freely on an area 48 of the surface of the load beam 10. Thus, as the magnetic head floats during operation, the dimple 46 pivots freely at the point of contact 48 with the load beam 10 in the pitch and roll moments of rotation. When the magnetic disc is rotated, an air spring is created by the air flowing between the surface of the disc and the rails 16 in the magnetic head slider 6, and the torsional characteristics (roll) of the suspension 11 must be such that the slider maintains its dynamic attitude through surface imperfections and vibrations of the rotating disc.

As magnetic recording technologies evolve, progressive miniaturization of head gimbal assembly components creates critical challenges. One is the tolerance control on the static attitude parameters of the suspension as the slider size is reduced. In fact, as the slider becomes smaller, the narrower width between its rails results in smaller differential pressure profiles that result in head gimbal assemblies having flying roll characteristics closely correlated to their static roll attributes. Accordingly, flying attitude characteristics may be predicted well by testing the static attitude of the suspension under controlled conditions.

Thus, in order to ensure the desired dynamic performance of the suspension (pitch, roll and resonance characteristics), each component of the assembly is manufactured according to specific design specifications and is bench tested for predetermined static parameters. The static attitude of each suspension 11 is measured and compared to allowable tolerances. As can be easily understood with reference to the simplified schematic view of FIG. 4, the static attitude is measured at the mounting surface of the gimbal tongue 42 and consists simply of an angle with respect to a reference datum parallel to the disc surface, such as the static angle $\alpha$ between the plane of the gimbal tongue 42 and a plane D parallel to the surface of the disc 4. If the measurement is outside the target tolerance for the suspension, the suspension is either discarded or adjusted by bending the load beams in the appropriate direction relative to the desired zero datum reference to modify the static characteristics of the suspension.

Several techniques are used in the industry to modify the static attitude characteristics of suspensions resulting from load-beam and gimbal forming imperfections. All such techniques utilize a cold-working type of manual, semi-automated, or fully automated bending process that deflects the beam beyond the yield point of the structure, thereby introducing residual stresses that affect the dynamic load and resonance performance of the suspension. While one parameter may be improved by the bending operation, another may be detrimentally affected beyond acceptable tolerances.

Therefore, there still exists a need for an improved method of modifying the static attitude and attendant roll characteristics of head gimbal assemblies without affecting their structural integrity and other performance parameters, such as the critical gram load and resonance performance of the assembly. This invention is directed at such a quality control process.

BRIEF SUMMARY OF THE INVENTION

One primary objective of this invention is a process for modifying the static attitude characteristics of a magnetic disc drive suspension assembly in such a manner that no stress is induced on the pre-load region of the suspension, thereby avoiding affecting the critical gram load or the resonance performance characteristics of the suspension.

Another important goal of the invention is a process that is able to affect the static attitude of the assembly while the structure is maintained within its elastic region, thereby ensuring that no cold working of the suspension is incurred.

Yet another goal is a process that makes it possible to selectively pin point the area of the suspension to be subjected to corrective deformation to ensure that it is restricted to portions of the load beam that prevent deterioration of the critical gram load setting or the resonance performance attributes of the suspension.

Finally, an objective of this invention is a process that can be implemented in an economical and commercially viable manner utilizing tools and instrumentation that are either already commercially available or can be constructed at reasonable cost.

Therefore, according to these and other objectives, the present invention consists of a process for modifying the static attitude characteristics of magnetic head suspensions by applying an infrared heat source to relieve stresses in specific regions of interest. Each head gimbal assembly is tested to measure its static-roll attitude with respect to a datum reference plane; the measurement preferably consists of a deflection angle. If the deflection angle is outside the limits of a predetermined allowable tolerance, thereby indicating a region that requires subjection to a torsional stress to bring the suspension within tolerance, an infrared beam is applied specifically to the region while the load beam is held at the torsional deflected state. The infrared source stress relieves the load beam so deflected, allowing it to establish a new free state with minimal residual stress remaining in the material of the beam. The assembly is then retested and retreated, if necessary, until its static roll characteristics fall within acceptable tolerances. An adaptive control algorithm may be utilized to optimize the process, so that successive suspension assemblies in a manufacturing batch are automatically modified with progressive efficiency to achieve target set points.

Various other purposes and advantages of the invention will become clear from its description in the specification that follows and from the novel features particularly pointed out in the appended claims. Therefore, to the accomplishment of the objectives described above, this invention consists of the features hereinafter illustrated in the drawings, fully described in the detailed description of the preferred embodiment and particularly pointed out in the claims. However, such drawings and description disclose but one of the various ways in which the invention may be practiced.

Figure 1:
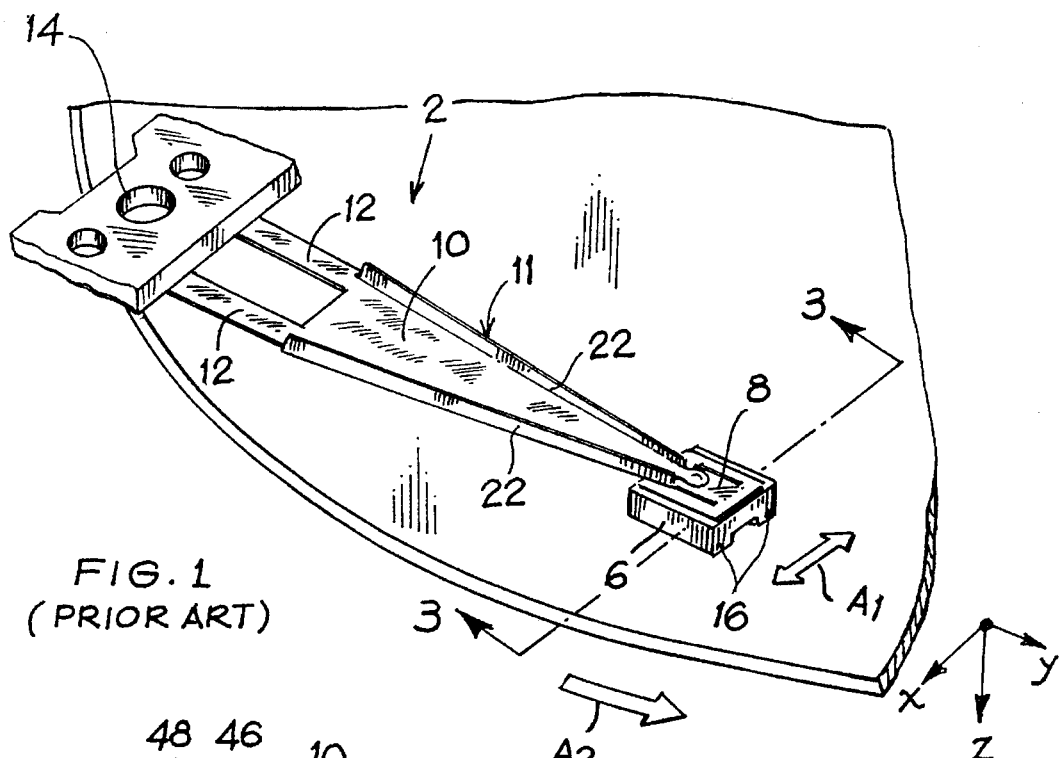
FIG. 1 is a simplified schematic representation of a conventional head gimbal assembly operating on a magnetic disc.
Figure 3:
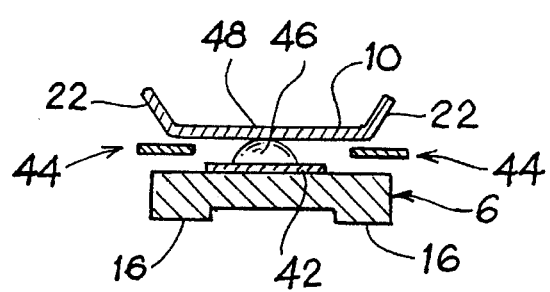
FIG. 3 is partial cross-section of FIG. 1, taken from line 3—3 in that figure, to illustrate the coupling between slider and load beam of conventional apparatus.
Figure 4:
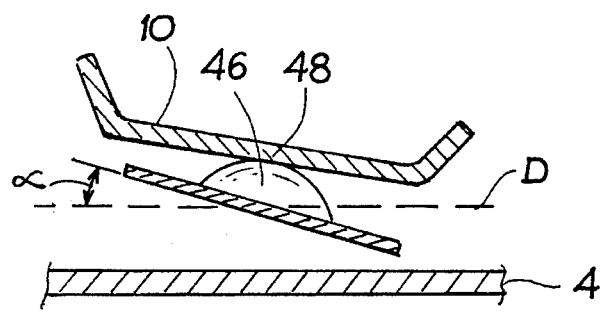
FIG. 4 is a simplified view of FIG. 3 illustrating the pivoting motion of the tongue of a conventional gimbal with respect to the magnetic disc.
Figure 2:
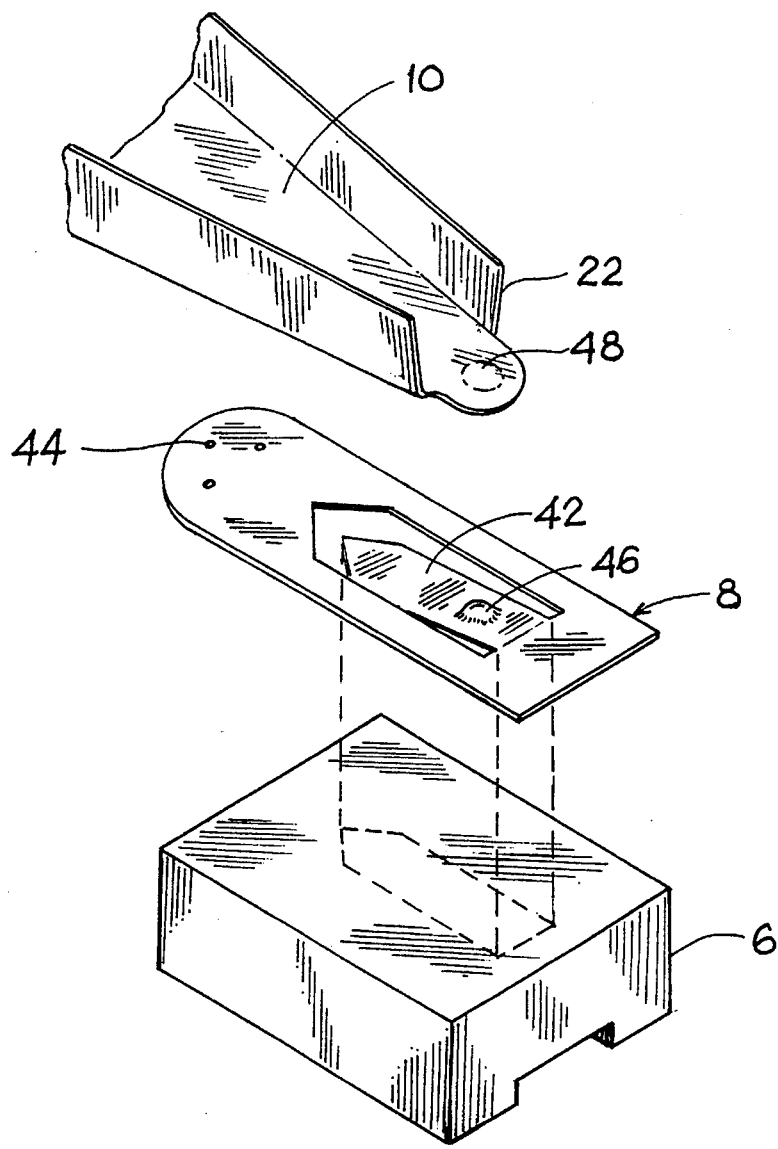
FIG. 2 is an exploded perspective view of the various components of conventional prior-art magnetic-head supporting apparatus.

DESCRIPTION OF THE PREFERRED
EMBODIMENTS OF THE INVENTION

The main point of this invention is the utilization of a localized heat source to relieve stresses in the material constituting magnetic head suspension assemblies in order to remove nonuniformities that cause unacceptable roll characteristics. This method eliminates the detrimental effects created by traditional processes of cold-working the suspension to deform it to produce the desired static attitude.

The invention is described with reference to x, y and z orthogonal coordinates wherein x and y define a horizontal plane and z defines a vertical direction, but it is obvious that the structure and operation of the features detailed in this specification can be rotated in any direction with equivalent results. It is also understood that the sizes of the various components shown in the drawings are not drawn to relative scale because of the very small dimensions of some features in comparison to others illustrated in the figures; therefore, they are represented only schematically for illustration.

Figure 5:
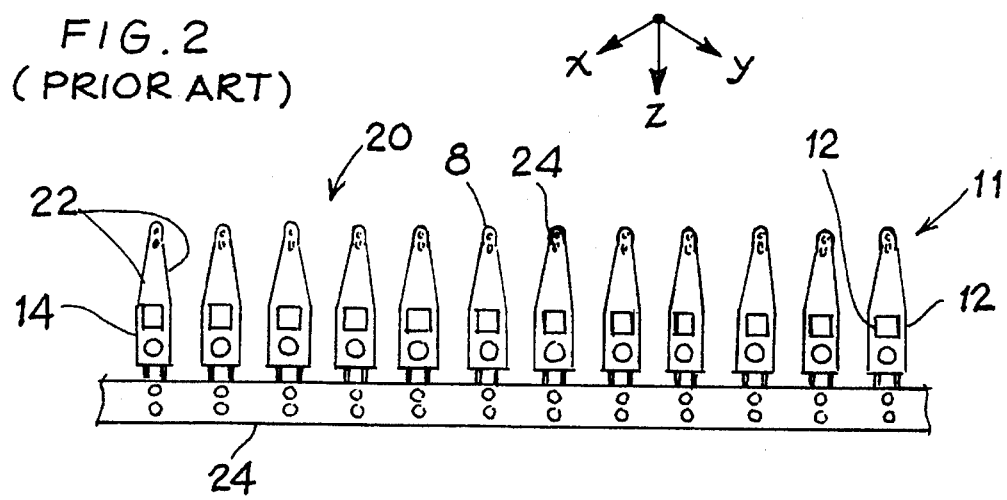
FIG. 5 is a plan view of a typical production fret of suspension assemblies.

Referring to the drawings, wherein like parts are designated throughout with like numerals and symbols, FIG. 5 illustrates in plan view a typical fret 20 of suspensions 11 produced by conventional photo-etching, forming and laser-welding processes.

Each suspension 11 consists of a metal portion that is formed from a very thin (in the order of 0.05 mm) metal sheet of homogeneous physical structure, thereby producing suspensions (and load beams) expected to have uniform torsional characteristics. The suspensions are also strategically punched or etched to produce desired dynamic responses to forces that cause flexure, and rigid structural rails 22 are typically formed in the suspension to provide support according to predetermined design criteria. As well understood by those skilled in the art, tooling holes 24 are also provided for alignment during testing and during various phases of production. Because of the homogeneous material from which the suspensions are constructed and the uniform manufacturing process to which they are subjected, the torsional characteristics of individual load beams are found to vary little within each fret and between different frets produced from the same batch of metal sheet. Therefore, corrective actions to modify the static roll characteristics of a given suspension in a fret may be based reliably on test measurements from another suspension in the same batch of frets tested and processed at an immediately preceding stage of the operation.

As an intermediate step in the overall production process, the static attitude parameters of a representative percentage of the suspensions is measured for quality control and analyzed with respect to target tolerances. Typically, semi-automatic or automatic equipment in the production line sequentially tests these sample suspension 11 by measuring the static roll of the suspension with respect to a datum plane parallel to the intended attitude of the suspension. In practice, the elevation at three or more points on the gimbal tongue 42 in a suspension is measured with respect to a common reference plane and any difference in measurements is translated into an angle of static deflection or roll by applying simple principles of trigonometry. If the static roll so measured is within design tolerances, the suspension proceeds to the next step of manufacture; otherwise, the product is either discarded or passed through a bending tool and subjected to a cold deformation designed to adjust its static roll characteristics to the desired parameters. As explained above, because of its cold-working feature, this procedure has the disadvantage of introducing undesirable stresses in the material that often result in unacceptable dynamic response characteristics.

Figure 6:
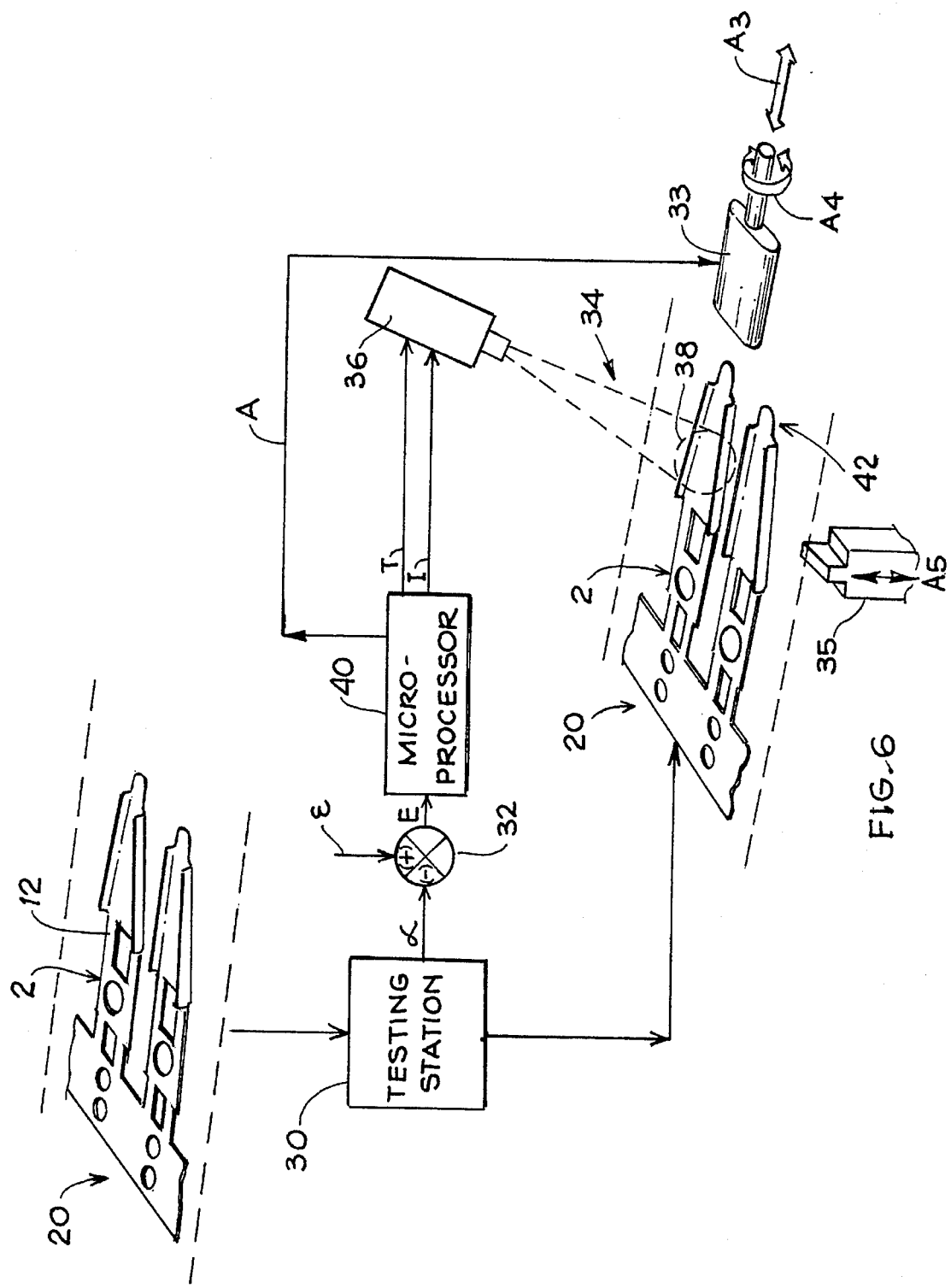
FIG. 6 is a schematic representation of the infrared stress-relief process of the invention.

FIG. 6 is a schematic representation of the method of the present invention, which, rather than relying on mechanical bending to adjust the static attitude of the suspension 11, utilizes a heat source focussed on a specific target on a load beam as required to release the mechanical stresses that cause such off-specification characteristics. It is noted that the same criteria known to those skilled in the art for choosing the parameters for correcting the static roll and pitch characteristics of a suspension by cold-work bending, such as the specific portion of the beam over which to apply the bending force and the amount of force to exert, are also applicable for the localized stress-relief process of this invention. Therefore, they are not explained in detail in this disclosure.

In practice, when a unitary suspension 11 in a fret 20 is found to be outside acceptable tolerances (that is, its static roll angle is greater than an acceptable maximum deviation), in the prior-art procedure it is bent by an arbitrary amount based on experience and is retested to check the result produced. Based on this test, the area of application and the force exerted on the next load beam being processed are adjusted to progressively improve the control parameters used in the process. Similarly, in the method of the invention shown in FIG. 6, the static roll angle of each suspension 11 is tested in a testing station 30 wherein a precise position indicator, such as a vision system utilizing 256-level digital image processing for focus measure of z heights, is used to measure the position of each gimbal tongue 42 in a suspension 11 to determine its static roll angle $\alpha$ with respect to a zero-roll plane. The angle $\alpha$ is then compared to a target parameter or tolerance $\epsilon$ in a comparator 32 to produce an error or deviation E. If the error E indicates that the angle $\alpha$ exceeds the target tolerance $\epsilon$, the load beam is flexed mechanically by a rotational tool 33 capable of clamping the suspension 11 and twisting it to produce a zero-roll attitude with respect to the zero datum created by a clamping tool 35. This tool is adapted to alternately clamp and release each load beam as indicated by arrow A5; while clamped, the load beam is held flat at a point just forward of the pre-toad region 12. The tool 33 may, for example, be retractable and adapted to move in and out longitudinally in order to clamp and release a suspension being processed, as indicated by arrow A3; and adapted for radial rotation to impart a rolling twist to the suspension, as indicated by arrow A4. While in this flexed position, the beam is subjected to a flux of thermal energy 34 from a heat source 36, such as an infra-red beam, directed to a specific target area 38 in the load beam and designed to relieve the stress in the material that caused the initial roll, so as to correct the beam's attitude. A microprocessor 40 may be utilized to control the heat source's processing time T and the amount of torsional rotation A of the suspension during the stress-relief step as a function of the error E according to conventional computer modeling and control techniques. The treated suspension may then be tested again and, if necessary, subjected to a similar treatment to adjust any residual off-specification static roll characteristic. Once a suspension is found to possess static attitude parameters within predetermined tolerances, it is released down the processing line and the next suspension is tested and treated. Notice that all of these steps, from initial testing to release, are preferably performed sequentially on a given suspension at multiple processing stations that include steps referred to in the art as measure, roll adjust, re-measure, and identify for process continuation or secondary adjust.

Figure 7:
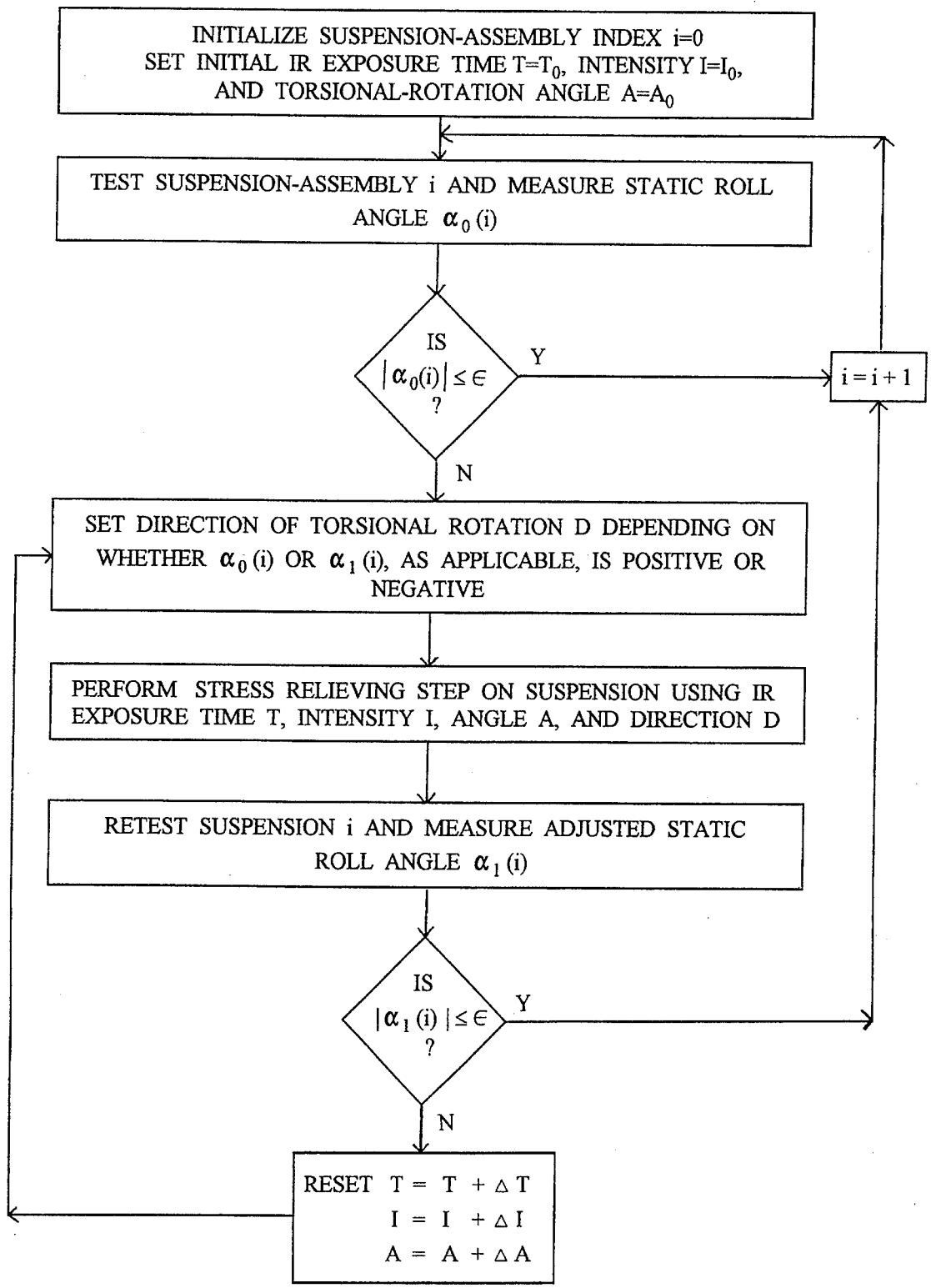
FIG. 7 is a flow diagram of the closed-loop, adaptive control algorithm utilized by the preferred embodiment of the invention.

In the preferred embodiment of the invention, a closed-loop adaptive control system is utilized to optimize the operation of an infra-red heat source while each suspension 11 in a fret 20 is being sequentially tested and processed. As mentioned above, inasmuch as all beams in a fret are manufactured from the same metal plate, as well as being formed in progressive dies, they are likely to possess similar static roll and pitch characteristics and defects. Therefore, any parameter information learned from the testing of a suspension 11 on a fret may be used to adjust the process parameters applied to treat a subsequent suspension in the same batch. Thus, as illustrated for example in the flow chart of FIG. 7, initial control parameters for the stress-relief process are chosen and recorded for the first suspension treated in a fret or batch of frets. Such parameters may be, for example, an infrared exposure time $T_o$ at a beam intensity $I_o$ and an angle of torsional rotation $A_o$ to be imparted to the load beam. These parameters are then updated for each subsequent suspension in the fret as a function of the static roll angle $\alpha$ measured for the last beam processed according to a predetermined control strategy. For example, if the last-measured angle $\alpha$ is within an allowable tolerance $\epsilon$, the exposure time and angle of torsional rotation may be set to minimum levels (e.g., 2.0 seconds and 5 degrees), such that the heat source 36 is activated only minimally when a subsequent load beam is tested with a static roll greater than the allowed tolerance $\epsilon$. Instead, if the last-measured angle $\alpha$ is still outside the allowable tolerance $\epsilon$, then the exposure time and angle of torsional rotation may incrementally be set to greater levels (e.g., 3.5 sec. and 10 degrees) until the static roll is reduced to an acceptable level. Using arbitrary logic derived from empirical experimentation, the experience of the cumulative stress-relief times and varied angular rotations found to be necessary to reduce the static roll of a given suspension to acceptable levels may then be used to calculate a new stress-relief time T and angular rotation A for subsequent suspensions. In practice, the beam intensity $I_o$ is predetermined by the specifications of the heat source 36 and is not changed during operation, although it could be used as an additional control parameter. These set parameters are then maintained constant for subsequent suspensions until one is again tested off-specification. When that occurs, the procedure is repeated to find new parameters for the algorithm and adapt it to correct the static roll characteristics of the new batch of suspensions.

As those skilled in the art understand, it is noted that the stress-relief process of this invention is preferably directed only to relatively rigid portions of the structure constituting the load beams of the suspension, so that the pitch and resonance characteristics of the suspension are not affected. At each stage of the process, the direction of the torsional rotation is selected as a function of the direction of the static roll angle $\alpha$ measured by the test. That is, while a positive test measurement $\alpha_1$ may require counterclockwise rotation to a predetermined angular torque in the load beam, a negative measurement $-\alpha_1$ would require treatment with a symmetrically opposite direction of rotation (i.e., clockwise).

Various changes in the details, steps and components that have been described may be made by those skilled in the art within the principles and scope of the invention herein illustrated and defined in the appended claims. Therefore, while the present invention has been shown and described herein in what is believed to be the most practical and preferred embodiments, it is recognized that departures can be made therefrom within the scope of the invention, which is not to be limited to the details disclosed herein but is to be accorded the full scope of the claims so as to embrace any and all equivalent processes and products.

I claim:

1. In a manufacturing process for a magnetic head suspension assembly having a head slider mounted on a metallic suspension intended for read/write application in very close proximity over a surface of a magnetic disc, a method for adjusting statics roll characteristics of said suspension assembly to conform to a predetermined parameter, wherein said static roll characteristics are measured by at least one deformation parameter indicative of the suspension assembly's static roll attitude, the process comprising the following steps:

(a) flexing said suspension assembly to a predetermined degree of deformation to cause said at least one deformation parameter indicative of the suspension assembly's static roll attitude to conform to said predetermined parameter; and (b) while the suspension assembly is in such flexed state, applying a beam of thermal energy to a predetermined target area in the suspension assembly for a predetermined time to relieve stresses in the suspension assembly so as to cause said at least one deformation parameter to conform to said predetermined parameters while the suspension assembly is in a free state.

2. The process of claim 1, wherein said beam of thermal energy consists of an infrared beam.

3. The process of claim 1, wherein said at least one deformation parameter consists of a static roll angle measured with reference to said magnetic disc.

4. The process of claim 2, wherein said at least one deformation parameter consists of a static roll angle measured with reference to said magnetic disc.

5. The process of claim 3, wherein said static roll angle is measured with respect to a plane parallel to the surface of said disc.

6. The process of claim 4, wherein said static roll angle is measured with respect to a plane parallel to the surface of said disc.

7. The process of claim 1, wherein said step (b) comprises sequential steps of stress relief of the suspension assembly, each such step being followed by testing of the suspension assembly to determine whether said at least one deformation parameter indicative of the suspension assembly's static roll attitude conforms to said predetermined parameter, and steps of adjustment of said predetermined time of operation of the beam of thermal energy to iteratively cause said at least one deformation parameter to conform to said predetermined parameter.

8. The process of claim 7, wherein said sequential steps of stress relief of the suspension assembly and of adjustment of the predetermined time of operation of the beam of thermal energy are controlled by means of a microprocessor.

9. The process of claim 7, wherein said beam of thermal energy consists of an infrared beam.

10. The process of claim 7, wherein said at least one deformation parameter consists of a static roll angle measured with reference to said magnetic disc.

11. The process of claim 9, wherein said at least one deformation parameter consists of a static roll angle measured with reference to said magnetic disc.

12. The process of claim 10, wherein said static roll angle is measured with respect to a plane parallel to the surface of said disc.

13. The process of claim 11, wherein said static roll angle is measured with respect to a plane parallel to the surface of said disc.

14. The process of claim 13, wherein said sequential steps of stress relief of the suspension assembly and of adjustment of the predetermined time of operation are controlled by means of a microprocessor.

* * * * *